Sept. 17, 1946.    G. JOHNSTON    2,407,884
MACHINE GUN MOUNT
Filed Dec. 3, 1942    7 Sheets-Sheet 5

Inventor
Greenhow Johnston,
By Ivan P. Tashof
Attorney

Patented Sept. 17, 1946

2,407,884

UNITED STATES PATENT OFFICE 2,407,884

MACHINE GUN MOUNT

Greenhow Johnston, Richmond, Va., assignor of one-half to Greenhow Maury, Jr., Richmond, Va.

Application December 3, 1942, Serial No. 467,770

26 Claims. (Cl. 89—40)

The present invention relates to a mount for machine guns and the like. While the mount constituting the present invention is particularly applicable for a machine gun, it may be used for instruments in general, including cameras, transits and sound instruments for detecting the approach of aeroplanes.

More particularly the present invention relates to a support or mount whereby a sub-caliber machine gun may be mounted on a movable vehicle such as a motor cycle, automobile, aeroplane, or the like.

In the prior patent, No. 2,085,024, granted June 29, 1937, there is described a mount for machine guns and the like which is particularly adapted to be supported from a motor cycle or similar vehicle. Although the mount described in this form of patent functions satisfactorily for the purpose designed, it was not particularly suitable where the machine gun had to be quickly and easily removed from the mount.

One of the objects of the present invention therefore is to provide a mount for a machine gun or similar device wherein the machine gun may be quickly and easily removed and mounted on the mount.

A second object of the present invention is to provide a mount for machine guns or the like in which the gun is firmly held and locked in position.

A third object of the present invention is to provide a mount for machine guns or the like which is principally supported from the axle of the front wheel of a motor cycle.

A fourth object of the present invention is to distribute the weight of the mount of the character described so that the minimum stress will be put on the relatively fragile parts of the motor cycle.

A fifth object of the present invention is to provide a mount wherein the forward and rearward parts of a machine gun are capable of being securely held and at the same time may be easily removed from the mount.

A sixth object of the present invention is to provide a release mechanism capable of releasing a gun from a mount of the character described quickly and easily and positioned in proximity to the trigger and handle of the gun so that the gun may be removed by one hand of the driver of the vehicle upon which the mount is placed.

A seventh object of the present invention is to provide an improved trigger pull associated with a machine gun which may be mounted remotely therefrom.

An eighth object of the present invention is to provide an improved trigger pull involving remote control of the trigger of a machine gun, said trigger pull being associated with the handle bars of a motorcycle or the like.

A ninth object of the present invention is to provide a remote control trigger pull mechanism having a safety catch preventing accidental actuation thereof.

A tenth object of the present invention is to provide a trigger pull arrangement associated with a mount and incapable of interfering with the proper mounting of the gun upon the mount.

An eleventh object of the present invention is to provide a forward support for a mount of the character described which is capable of being adjusted to fit various types of guns.

A twelfth object of the present invention is to provide a mount for a machine gun or the like upon a vehicle with a remote control arrangement associated therewith.

Other objects and advantages of the present invention will become apparent from the subsequent description and figures of the drawings, wherein.

Figures 1, 4, 5:
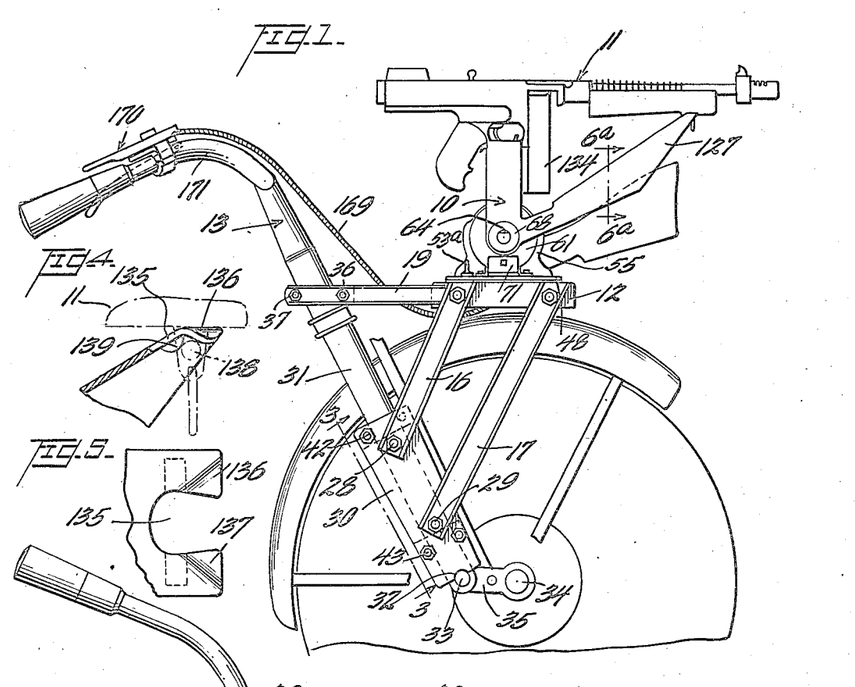
Figure 1 is a side elevation of a portion of a motorcycle, machine gun and mount therefor according to the present invention.
Fig. 4 is a detail partly in section of the front support for the machine gun.
Fig. 5 is a plan view of the support of Fig. 4.
Figures 14, 15, 16, 17, 18:
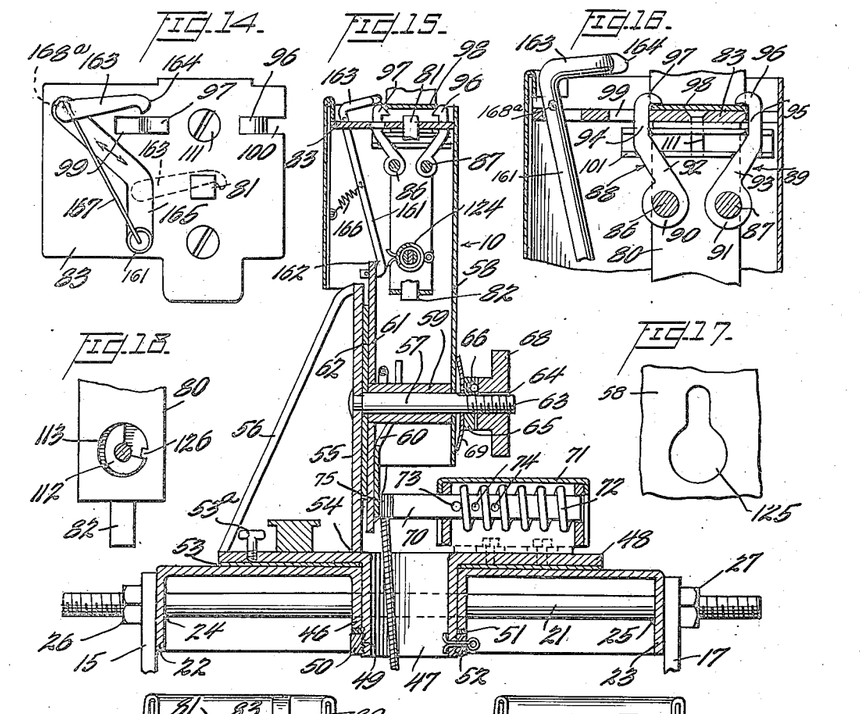
Fig. 14 is a plan view of the upper end of the mount of the present invention.
Fig. 15 is a vertical section of the mount showing a trigger guard being placed thereon.
Fig. 16 is a vertical section of the upper end of the mount with a trigger guard in position thereon.
Fig. 17 is a detail of the lock slot in the mount casing.
Fig. 18 is a detail of the tightening or locking cam.

Referring to the drawings and particularly Fig. 1 thereof, a mount indicated in general at 10 is here shown adapted to support a machine gun 11. The mount 10 includes a base portion 12 supported on the front portion of a motorcycle indicated in general at 13 by four channel members indicated at 14, 15, 16 and 17 respectively. Two additional channel members 18 and 19 are also provided which prevent the tilting movement of the base 12. Each of the upper ends of the channel members 14, 15, 16 and 17 extend about the ends of threaded rod members 20 and 21, the upper ends of the channel members 14 and 16 cooperating with the rod 20, and the upper ends of the channel members 15 and 17 cooperating with the rod 21. As best shown in Fig. 15, the rods 20 and 21 extend the full width of the base member 12 and are welded to the side flanges 22 and 23 of the base member, as indicated at 24 and 25. Nuts, such as nuts 26 and 27, are provided for securing the channel members on the rods.

Referring once again to Fig. 1, it will be noted that the lower ends of the channel members 16 and 17 are bolted as by bolts 28 and 29 to a plate 30 suitably clamped on a portion 31 of the front fork of the motorcycle 13. The lower end of the plate 30 is provided with a semicircular recess 32 which is adapted to fit over and be supported by a spindle 33 normally provided on a motorcycle and coupled to the axle 34 by a link 35. It is to be understood that the channel members 14 and 15 are similarly fastened to a portion of the motorcycle fork on the other side of the motorcycle. This arrangement enables the greater part of the weight of the base member 12 to be carried by the spindles upon which the plates rest, and consequently by the front axle of the motorcycle to which the spindles are linked.

Figures 2, 3:
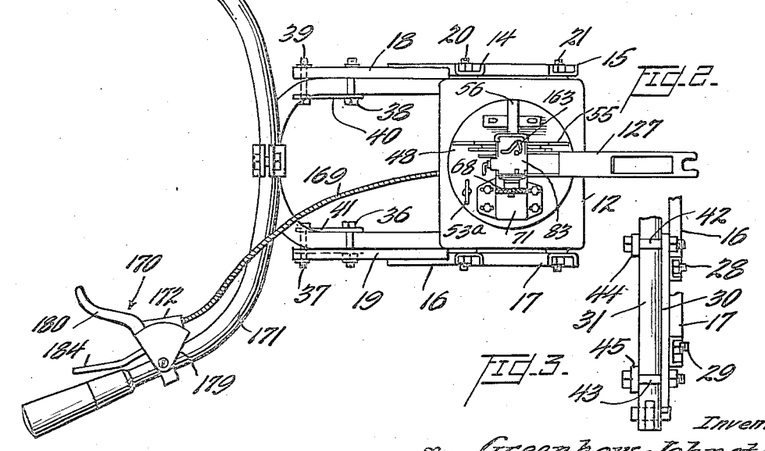
Fig. 2 is a plan view of the device of Fig. 1 with the machine gun removed.
Fig. 3 is a detail taken along the line 3—3 of Fig. 1.

As shown particularly in Fig. 2, the rear ends of the channel members 18 and 19 are clamped to portions of the front fork by the bolts indicated at 36, 37, 38 and 39 and cooperating plates 40 and 41. As best shown in Fig. 3, the plate 30 is clamped to the front fork portion 31 as by bolts 42 and 43 and plates 44 and 45.

Again referring to Fig. 15, it will be noted that the base member 12 is provided with a projecting hub portion 46 which is of circular shape. The hub 46 receives a similar hub 47, projecting from a disk member 48. The lower end of the hub 47 is threaded, as indicated at 49 to receive a nut 50 which secures the two hubs 46 and 47 together, while permitting relative rotation thereof. Interposed between the nut 50 and the hub 46 is a washer 51 and a cotter pin 52 extends through openings in the nut 50 and the end of the hub 47 to prevent the nut from unscrewing. A suitable leather washer member 53 is also provided between the disk member 48 and the upper surface of the base 12 for retarding the relative movement of the disk and base as set forth in detail in prior Patent No. 2,085,024, previously referred to. This arrangement provides a controlled drag for the movements of the gun and mount on the base, and also serves to absorb the shock of firing the gun. A thumb screw 53a is provided which is threaded into the disk member 48. This thumb screw may be tightened to bear against the leather washer member 53 to retard and/or lock the turning movement of the disk just described.

Extending upwardly from the disk or turntable 48, and welded thereto as indicated at 54, is a standard 55 having a generally rounded upper edge. A brace 56 is also provided suitably joined at its upper end to the standard, and its lower end to the disk 48. A spindle 57 extends from the standard 55 and functions as a horizontal pivot for the gun and main portion of the mount. The main portion of the mount includes a casing 58, having a bearing portion 59 welded within its lower end, a cam 60 welded to the bearing portion 59, and a disk member 61 welded to the cam. The bearing 59, cam 60 and disk 61 are all rotatably mounted on the spindle 57. Interposed between the disk 61 and the standard 55 is a washer 62 of leather or other suitable material having a similar function to the washer 53 previously described. The outer end of the spindle 57 is threaded, as indicated at 63, and an upper section of the threaded portion is cut away or flattened, as indicated at 64. A washer 65 is slidably and non-rotatably fitted over the flattened portion of the spindle, and is provided with a spring pressed ball 66 projecting therefrom. The spring pressed ball cooperates with a plurality of notches 67 (see Fig. 7) on the inner face of a nut 68 threaded on the spindle 57. A lock spider 69 is also provided between the washer 65 and the side of the casing 58 to prevent rotation of the washer 65.

It is evident therefore that when the nut 68 is rotated, the casing 58 will be moved to the left, as shown in Fig. 15, and the drag produced by the washer 62 against rotation of the casing 58 on the spindle 57 will be increased.

An additional means for checking the rotation of the casing 58 on the spindle 57 includes the cam 60 and the follower 70. The follower 70 is slidably mounted in a casing 71, bolted to the disk 48. The follower 70 is urged against the cam 60 by a spring 72, bearing against a pin 73 on the follower at one end, and against the casing 71 at its other. The pin may be adjustably inserted in a number of openings 74 in the follower to vary the tension of the spring 72. The end of the follower is provided with a composition shoe 75, cooperating with the cam 60. By providing the cam 60 with a low portion 76 (Fig. 6), the casing tends to remain in a position corresponding to the position of the low portion, and any movement from this position is resisted by the follower. In general, this position of the casing 58 corresponds to a horizontal position of the gun 11, although the low portion 76 of the cam may be positioned to bias the casing 58 and the gun into any position.

Figures 6, 6A, 7, 8, 9, 10, 11, 12, 13:
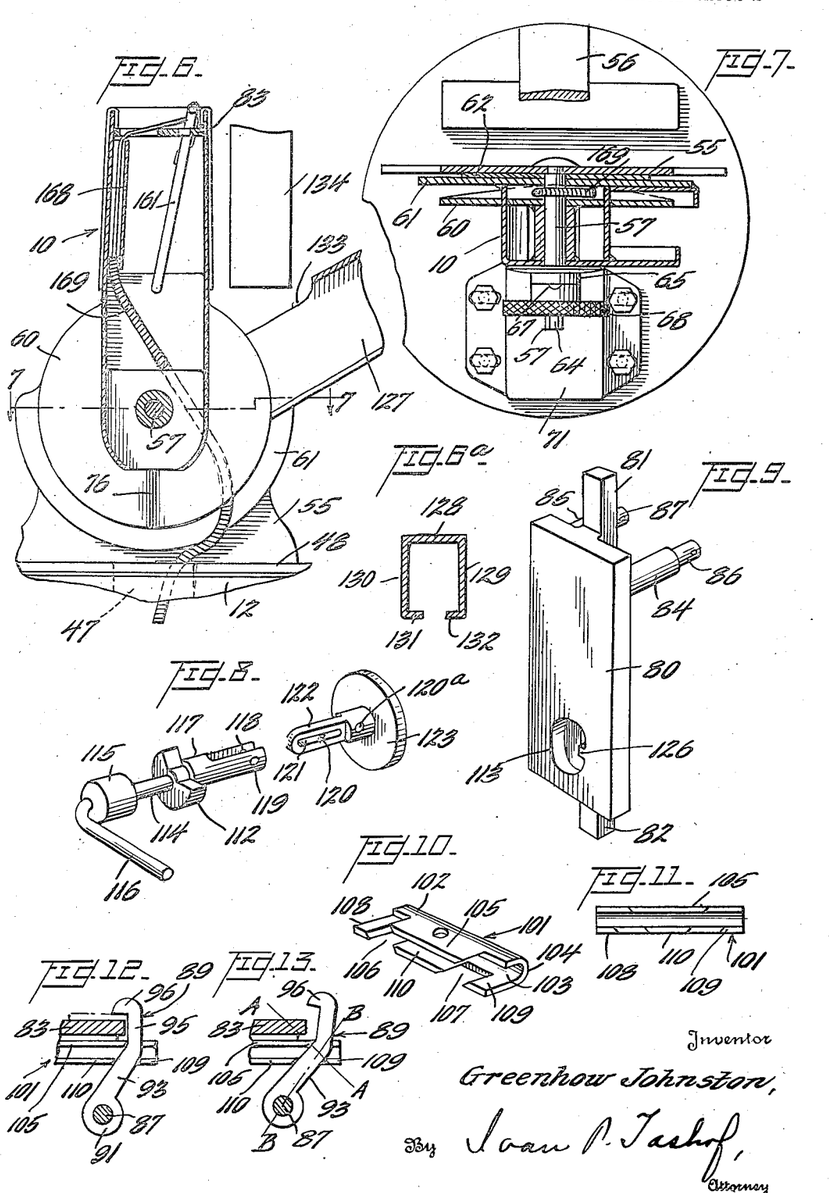
Fig. 6 is a vertical section of a portion of the support showing the support end of the trigger pull.
Fig. 6a is a detail section taken along the line 6a—6a of Fig. 1.
Fig. 7 is a section taken on the line 7—7 of Fig. 6.
Fig. 8 is a detail perspective view of the mount lock handle and associated parts.
Fig. 9 is a perspective view of a portion of the lock mechanism.
Fig. 10 is a perspective of the guide for the locking pawls.
Fig. 11 is a side elevation of the guide of Fig. 10.
Fig. 12 is a diagrammatic illustration of one of the hook members and guide cooperating therewith.
Fig. 13 is a view similar to Fig. 12 with the hook member in elevated open position.
Figures 19, 20:
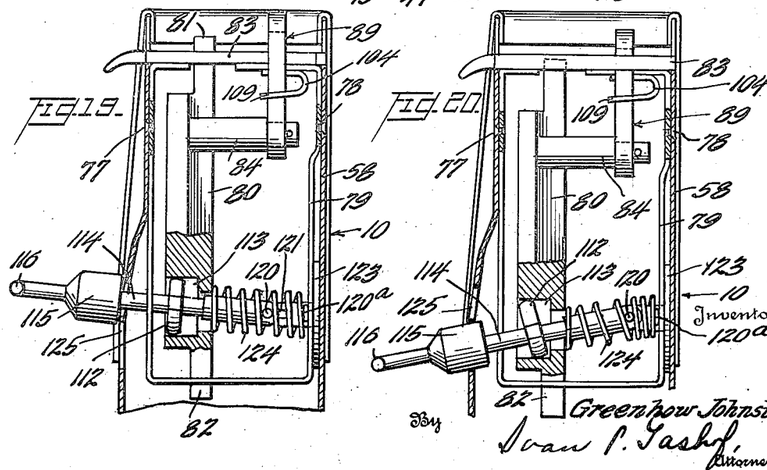
Fig. 19 is a vertical section of the upper end of the mount taken at a 90° angle relative to Figures 15 and 16, showing the locking handle in the upper end of the lock slot.
Fig. 20 is a section similar to Fig. 19 with the handle in locking position.

Mounted within the casing 58 as by screws 77 and 78 is a frame member 79. Fitted within the frame member 79 is a slide 80 having projecting portions 81 and 82 at each end thereof. The lower projecting portion 82 is received in an opening in the frame member 79, and the upper projecting portion 81 projects through an opening in the top 83 of the casing. In addition to guiding the movement of the slide 80, this latter projecting portion 81 has another function to be hereinafter described. A pair of axles 84 and 85 also extends from the slide 80. As shown in Fig. 9, each of these axles is provided with a reduced portion 86 and 87 at said free ends. As shown in Fig. 16, each of these reduced portions carries a hook member. These hook members are indicated by the reference numerals 88 and 89. Each of these hook members includes hub portions 90 and 91, angularly extending portions 92 and 93, vertically extending portions 94 and 95, and horizontally extending portions 96 and 97 adapted to grasp the trigger guard 98 of the gun 11. As previously pointed out, the slide 80 is movable upwardly and downwardly in the casing 58. Upward movement of the slide 80 will carry the hook members 88 and 89 upwardly to project to a greater degree through the openings 99 and 100 in the top 83. The hook members and slide are shown in this position in Fig. 19. In Fig. 20, however, the slide 80 and hook members are shown in a lowered position. As the hook members 88 and 89 are moved upwardly and downwardly, they are guided away from and toward one another by the guide 101, best shown in Figs. 10 and 11. The guide 101 is of general U shape in cross section, and includes the two portions 102 and 103 and connecting portion 104. The upper portion 102 is cut away at each end to produce a transverse projecting portion 105, and the lower portion 103 is slotted at 106 and 107 to provide two projecting portions 108 and 109 and a central projecting portion 110. The cooperation of the hook members and guides is best illustrated in Figs. 12 and 13 where a single hook member indicated at 89 is shown cooperating with the projecting portions 105 and 109. As shown in Fig. 13, the line A—A thru the portions 105 and 109 is substantially perpendicular to the line B—B thru the hook 89. This arrangement enables the portions 105 and 109 to be more closely spaced than if they were both in the same plane and hence not perpendicularly aligned relative to the axis of the hook 89. When the hook 89 is in elevated position, as shown in Fig. 13, the portions 105 and 109 still cooperate with the hook 89 to steady the same, although it will be noted that the portion 110 is now spaced from the hook.

As best shown in Fig. 16, the guide 101 is held in position, as by a screw 111, threaded thru the top 83 of the casing. It is evident from the foregoing that as the slide 80 is moved upwardly, the hook members 88 and 89, are spread apart by the guide 101, and as the slide 80 is moved downwardly, the hook members are moved also toward each other as they move downwardly until, as shown in Fig. 16, they are in position to firmly grasp the gun trigger guard 98.

The slide 80 is moved upwardly and downwardly by a cam 112 which is positioned within a recess 113 of the slide. (Figs. 19 and 20). As best shown in Fig. 8, the cam 112 is integral with a shaft 114, a cylindrical portion 115 and a handle member 116. Also extending from the cam 112 is a bifurcated portion 117 provided with openings 118 and 119 adapted to receive a pin 120 slidably mounted in a slot 121 in the member 122. The member 122 projects from a disk 123 which is mounted between the frame member 79 and the casing 58, as shown in Figs. 19 and 20. A spring 124 is also provided which bears against the frame 79 and the slide 80. The pin 120 also extends thru the convolutions of the spring 124 so that the spring tends to move the bifurcated portion 117, the cam 112 and the handle to the right, as shown in Figs. 19 and 20. A cotter pin 120a holds the disk 123 in place. A bayonet slot 125 in the casing 58, best shown in Fig. 17, cooperates with the shaft 114 and the cylindrical portion 115. In Fig. 20, the cylindrical portion 115 is within the large portion of the bayonet slot 125, while in Fig. 19 the cylindrical portion 115 has been moved clear of the casing 58 and the shaft 114 is positioned in the narrow portion of the bayonet slot 125. It may be noted that the cylindrical portion 115 may be moved from the position of Fig. 20 to that of Fig. 19 by pulling the handle 116 outwardly, sliding the pin 120 in the slot 121 against the action of the spring 124 until the cylindrical portion 115 has cleared the casing 58, and then moving the handle upwardly. This movement of the handle will move the slide 80 upwardly thru the cooperation of the cam 112 and the edges of the opening 113. This movement of the slide 80 will move the hooks 88 and 89 upwardly, and the upper ends of the hooks outwardly to the position of Fig. 15. Conversely, movement of the handle 116 downwardly will move the slide 80 and the hooks downwardly and inwardly to grasp the trigger guard 93. As shown in Figs. 18 and 9 the opening 113 is provided with a stop member 126 which limits the rotational movement of the handle 116, the shaft 114 and the cam 112. It is desired to point out also that the cam 112 and sides of the opening 113 are eccentric relative to one another, and rotation of the shaft 114 in a clockwise direction by the handle 116 will, therefore, move the slide 80 downwardly. This provision enables the hook members 88 and 89 to be given a slight downward movement after the initial downward movement just previously described, so that all play may be removed and wear of the hook members and other parts may be compensated for. The handle is moved in a counterclockwise direction to loosen the hooks 88 and 89 just prior to moving the handle outwardly and upwardly to release the hooks 88 and 89 from the trigger guard 93.

The mount of the present invention also includes a means to support the forward end of a machine gun or the like. Referring once again to Fig. 1, it will be noted that a member 127 extends forwardly at an angle from the casing 58 previously described. As shown in Fig. 6a, the member 127 includes an upper portion 128, a pair of side flanges 129 and 130, and a pair of fragmentary bottom flanges 131 and 132. An opening or slot 133, best shown in Fig. 6 is provided in the upper portion just beneath the magazine 134 of the gun 11, so that when the magazine is removed from the gun 11, it will drop into the opening 133 and rest on the lower flanges 131 and 132.

The forward end of the member 127 is provided with a notch 135, best shown in Fig. 5. The notch 135 is adapted to fit about the strap holding bracket normally provided at the front end of the gun 11, as best shown in Fig. 4. As also shown in this figure, the side members 136 and 137 defining the notch 135, are bent downwardly to extend over the pin 138 normally provided on the gun 11. A projection 139 is also provided, so that the pin 138 rests in a notch between the projection 139 and the projecting portions on the members 136 and 137. When the gun 11 is mounted on the mount, it is drawn rearwardly so that the pin 138 slips into the notch, and then the rear of the gun 11 and the trigger guard is pushed downwardly upon the clamping hooks previously described.

Figures 31, 32, 33, 34, 35, 36, 37, 38, 39:
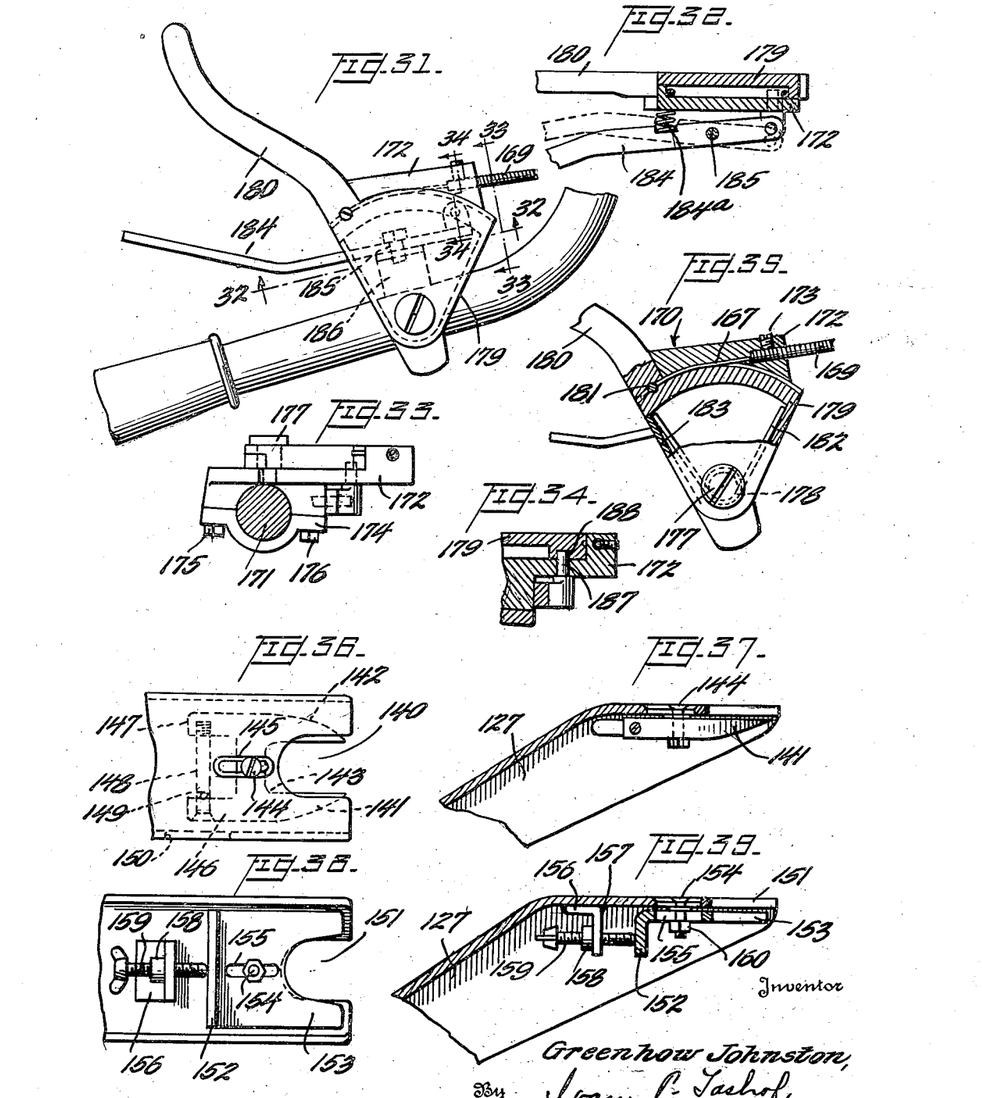
Fig. 31 is a detail of a trigger pull associated with a motorcycle handle bar.
Fig. 32 is a section taken on the line 32—32 of Fig. 31.
Fig. 33 is a view of a portion of the trigger pull mechanism, the wire casing and the handle bar being shown in section.
Fig. 34 is a section taken on the line 34—34 of Fig. 31.
Fig. 35 is a plan view of a portion of the trigger pull of Fig. 31 partly broken away.
Fig. 36 is a detail of a modified front clamp for the mount.
Fig. 37 is a detail vertical section of Fig. 36.
Fig. 38 is a bottom plan view of another modified front clamp arrangement.
Fig. 39 is a vertical section of the front clamp of Fig. 38.
Figure 40:
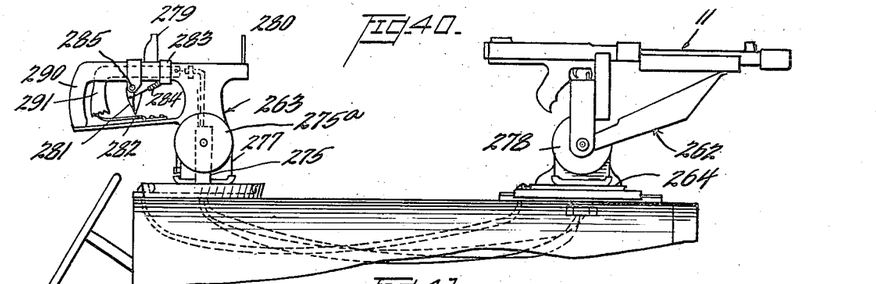
Fig. 40 is a side elevation of a remote control arrangement.
Figure 41:
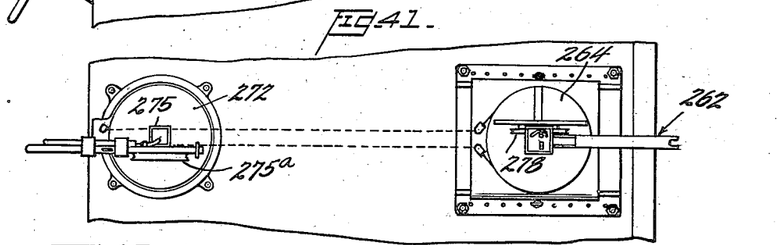
Fig. 41 is a plan view of the device of Fig. 40.

Referring to Figs. 36 and 37, there is here shown a modified arrangement for clamping the forward end of the gun 11 on the mount. As shown, a notch 140 is also provided which is adapted to fit about the strap holding bracket assembly. Beneath the notch, however, there is provided a pair of members 141 and 142 which are spaced to provide a notch 143 beneath the notch 140. The members 141 and 142 are pivotally mounted on a screw 144 which is in turn slidably mounted within the slot 145. The rear end of the members 141 and 142 are formed into tails 146 and 147. Extending through the tail 146 and threaded into the tail 147 is a screw 148. The screw is provided with a pin 149 so that it is axially immovable relative to the tail 146. An opening or slot 150 is provided so that the head of the screw 148 is accessible for turning. The turning of the screw will bring the tails 146 and 147 together, or move them apart to in turn widen or narrow the notch 143, so that the same will be capable of fitting any individual gun. This adjustability is increased by the sliding movement of the members 141 and 142 which may be effected by loosening the screw 144 and moving the same in the slot 145. In the modification shown in Figs. 38 and 39, a similar notch 151 is provided in the end of the member 127, and an angle member 152 is provided underneath the notch 151. The member 152 is provided with a portion 153 which underlies the notch 151. The angle member 152 is supported on the end of the member 127 by a screw 154, fitting into a slot 155. A bracket 156 is welded to the under side of the member 127, as indicated at 157. The depending portion of the bracket 156 is provided with a threaded collar 158 which receives a wing screw 159, provided with threads cooperating with threads in the collar 158. It is evident, therefore, that the member 152 may be moved forwardly by turning the wing screw 159, and will be held in any position by tightening the nut 160 on the screw 154.

Referring once again to Figs. 14 and 15, there is here shown a trigger operating mechanism including a trigger actuating member 161, pivoted at 162 on the disk 61. The upper or free end of the member 161 is provided with a bent portion 163 having a trigger actuating nose or hook 164. The straight portion of the trigger actuating member 161 extends through a slot 165 in the top 83 of the mount, as best shown in Fig. 14. A spring 166, attached at one end to the trigger actuating member 161 and at the other end to a suitable eyelet on the inner wall of the casing 58 keeps the member in the position shown in Fig. 14. An actuating wire 167 is provided which is passed through and fastened in an opening 168a at the upper end of the member 161. Movement of the wire 167 will, therefore, pull the bent portion 163 and the nose 164 into the dotted line position shown in Fig. 14 to pull the trigger of the gun 11. This movement, however, is prevented by the upper end of the hook 97, unless the gun and guard are in position upon the mount. This arrangement prevents the portion 163 from being accidentally pulled into trigger actuating position before the gun is placed on the mount, and consequently preventing placing the gun on the mount. The wire 167 extends downwardly through a tube 168, best shown in Fig. 6. The lower end of the tube 168 is connected to the outer casing 169 of a Bowden wire assembly, wherein the wire 167 forms the core. As shown in Figs. 6 and 7, the Bowden wire extends downwardly through the opening 47. As shown in Fig. 1, the other end of the Bowden wire 169 is connected to a trigger pull handle assembly, indicated in general at 170 and mounted on the handle bar 171 of the motorcycle.

Referring to Figs. 31 to 35 inclusive, it will be noted that the outer casing 169 is fastened to a stationary portion 172 of the trigger pull handle assembly 170 by a set screw 173. The stationary portion 172 is clamped to the handle bar 171, as best shown in Fig. 33, by a bracket 174, and bolts 175 and 176. A pivot or journal 177 extends from the stationary portion 172, and is provided with a slotted head 178, best shown in Fig. 35. Mounted on the pivot 177 for pivotal movement relative to the portion 172 is a movable member 179, provided with a handle 180. As shown in Fig. 35, the core wire 167 is fastened to the movable member 179 at 181. Pivotal movement in a counterclockwise direction of the handle 180, as shown in Figs. 31 and 35, will, therefore, move the core 167 relative to the stationary portion 172 and the casing 169 of the Bowden wire. Since, as previously described, the wire 167 is fastened to the trigger actuating member 161, such a movement will similarly move the trigger actuated member to actuate the trigger. The counterclockwise movement of the handle 180 is opposed by a spring 182, wound about the journal or pivot 177, as shown in Fig. 35, and having one leg bearing against the inner side of the movable member 179, and the other leg bearing against a portion, indicated at 183, of the stationary member 172. A lock is also provided which entirely prevents movement of the trigger, and consists of a lever 184, pivoted on a pivot 185, carried by a stationary portion, indicated in dotted lines in Fig. 31, and designated by the reference numeral 186. The handle member 184 is provided at one end thereof with a pin 187, best shown in Fig. 34. A spring 184a normally biases the handle 184 in a counterclockwise direction about the pivot 185, so as to maintain the pin 187 in a notch 188 in the movable member 179. The handle 184, however, may be manually grasped and moved in a clockwise direction about the pivot 185 to the position indicated in dotted lines in Fig. 32, to release the handle 180 and the movable portion 179, so that the trigger may be actuated. Since the handle 184 is sheltered both by the handle bar and the handle 180, there is substantially no danger of the handle 184 being moved accidentally to release the handle 180, and thus a positive locking means is provided for the trigger actuated handle.

In Figs. 21 to 25 inclusive, a modified type of mount is shown for supporting the gun 11 at a higher elevation on a motorcycle. This type of mount includes a central supporting column, indicated in general at 189, and including hook members shown in Fig. 22 and indicated by the reference numerals 190 and 191, which are entirely similar in operation to the hook members 88 and 89 previously described. Instead of a front support, however, a rear support, indicated in general at 192, is provided, which is adapted to fit the rear of the gun receiver.

The upper end of the rear support is cut away, and projecting from the cut away portion is a holder 193 pivoted on the pivot 194 in the upper end of the rear support. The holder 193 is provided with a pair of inturned upper edges 195 and 196 fitting into the grooves normally provided at the lower rear end of the gun receiver. These grooves are indicated in dotted lines in Figure 24 by the reference character 197. A spring 198 is fastened to a pawl 199 at its lower end, as indicated at 200. The upper end of the spring bears against the lower surface of the receiving member 193, and normally biases the same angularly upward about the pivot 194. When the gun is assembled with the rear support therefor, the rear end of the receiver is slid into the holding member 193, so that the two edges 195 and 196 enter the grooves normally occupied by the stock until the lower rear end of the receiver abuts the pivot member 194. The gun and receiving member 193 are then rotated downwardly about the pivot 194 until the upper end of the pawl 199 enters a notch 201 in the lower rear end of the gun receiver which is normally provided therein. When the gun is then rotated downwardly so that the trigger guard is grasped by the hook members 190 and 191, the rear end thereof can not be removed from the holding mechanism just described. When the trigger guard is released in the same manner as previously described in connection with the mount of Figure 1, the gun can then be rotated upwardly about the pivot 194 and easily removed from the upper end of the support 192.

Figures 21, 22:
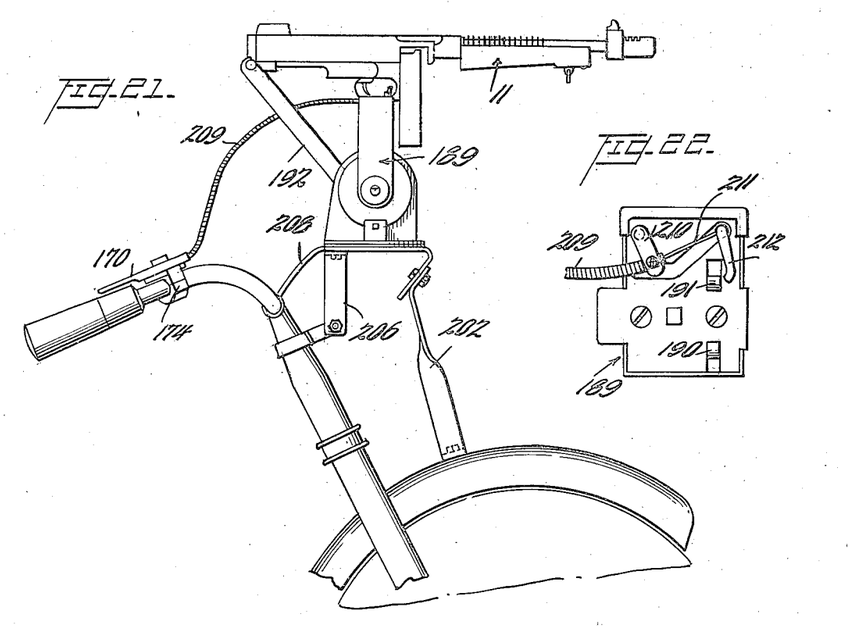
Fig. 21 is a side elevation of a modified high level mount.
Fig. 22 is a plan view of the upper end of the mount of Fig. 21 with the gun removed.
Figures 23, 24, 25:
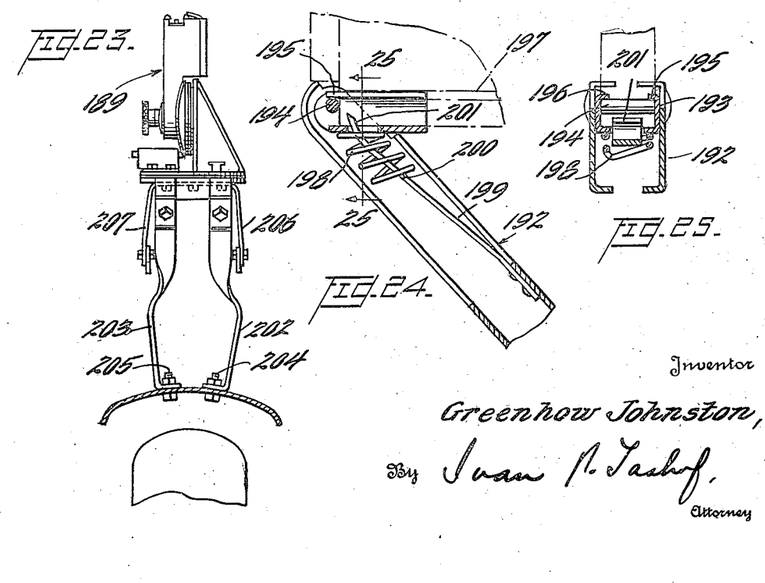
Fig. 23 is a front elevation of the mount of Fig. 21.
Fig. 24 is a vertical section of the rear brace of Fig. 21 and gun support, and locking means associated therewith.
Fig. 25 is a section taken on the line 25—25 of Fig. 24.

The support for the high mount, Figs. 21 to 25, inclusive, consists essentially of a pair of members 202 and 203, which may be fastened to the mud guard of the motorcycle, as indicated at 204 and 205, respectively. Supplementary supporting members are indicated at 206 and 207. These members may be carried by the upper portion of the front fork of the motorcycle by means of suitable brackets. An additional support 208 may also be provided which can be suitably fastened to the handle bar of the motorcycle, as shown in Fig. 21. In this type of mount, it has been found desirable to carry the Bowden wire 209 directly rearwardly to the handle bar, as shown in Fig. 22. The outer casing of the Bowden wire will then be fastened to a member 210 on the top of the mount. The Bowden wire 209 is provided with a core 211, which similarly operates a trigger operating member 212, the operation of this member being entirely similar to the member 163 of Fig. 15. The wire 209 runs to a similar controlling handle on the handle bar to that previously described.

Figure 26:
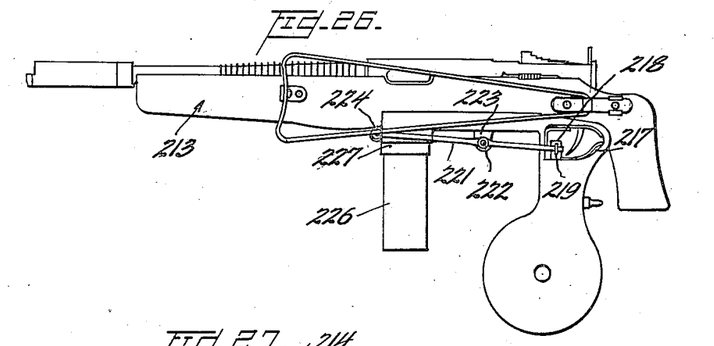
Fig. 26 is a side elevation of a modified support for a machine gun.
Figures 27, 28, 29, 30:
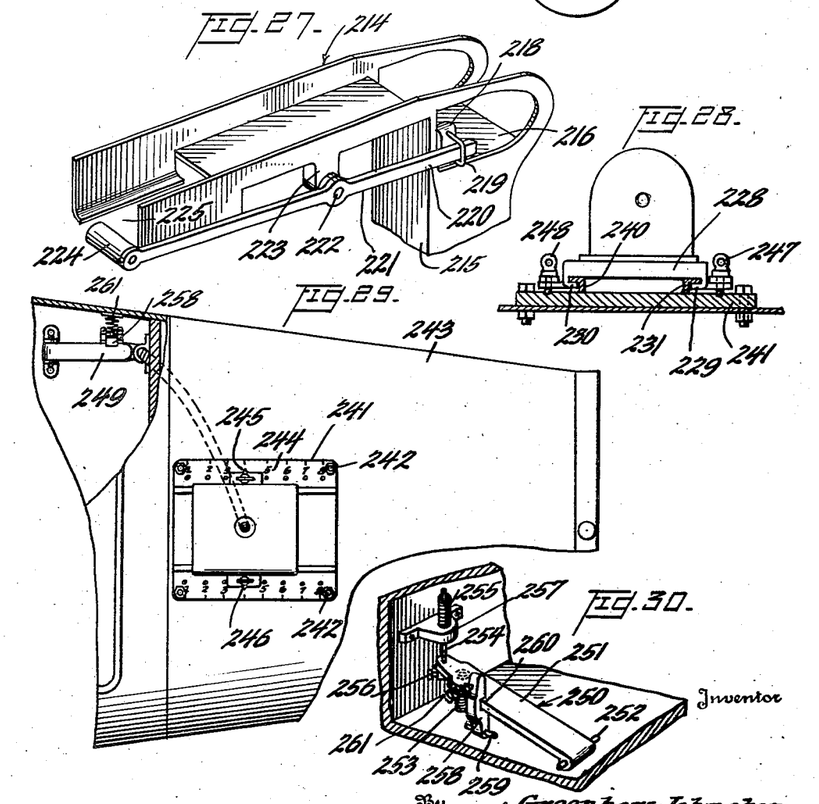
Fig. 27 is a perspective view of the upper end of the mount of Fig. 26.
Fig. 28 is a detail of a base member for the gun mount.
Fig. 29 is a plan view of the base member of Fig. 28 in position on a vehicle and a modified trigger pull associated therewith.
Fig. 30 is a perspective view of a foot operated trigger pull.

In Figs. 26 and 27, there is shown a novel head for supporting a machine gun of the Reisser type. Referring to Fig. 26, the gun is indicated in general by the reference numeral 213, and the novel supporting head is indicated in general by the reference numeral 214. The head is provided with a casing 215, similar to the casing 58 of the support shown in Fig. 1, and similarly supported in general. The upper end of the casing 215 is provided with a top 216 which receives the trigger guard indicated in Fig. 26 at 217. Hook members are provided to clamp the trigger guard in place, of which one is shown and indicated at 218. It is to be understood that a similar complementary hook member is provided, and that the hook member 218 and complementary hook member reciprocate upwardly and downwardly through the top portion 216 to clamp the trigger guard in place, this action being similar to that of the hook members 96 and 97. The hook member 218, however, is provided with a laterally extending bail 219, adapted to receive the portion 220 of a lever 221, pivoted on the head 214 as by a pivot 222 which projects from a lug 223 integral with the head 214. The end of the lever 221 remote from the portion 220 is provided with a roller 224. It will be noted further that the head 214 is provided with an open portion 225 at the forward end thereof which is adapted to receive the magazine of the gun indicated at 226 and the magazine receiving portion 227. When the gun is placed in position on the head 214, therefore, and the hook member 218 is moved downwardly in the same manner as described in connection with the hook member 96 of the first described modification, the bail 219 is moved downwardly, and the roller 224 is moved upwardly to clamp the magazine receiving portion 227, so that the gun is then held both by the magazine receiving portion and its trigger guard.

Referring to Fig. 28, there is shown a supporting arrangement for the mount of the present invention which is adapted to be used on a vehicle having a considerable supporting surface, such as an automobile, truck or boat. In this type of support, a base member 228 is provided having turned end flanges 229 and 230. The base member 228 in other respects is similar to the base member 12 of Fig. 1, and the other portions of the mount may also be entirely similar to any of the mounts herein described. The flanges 229 and 230 fit slidably beneath complementary flanges 231 and 240, projecting from a member 241. The member 241 in turn is bolted as by bolts 242 to the hood of a vehicle indicated at 243 in Fig. 29, or to any other suitable flat surface. The member 241 may be provided with calibrations 244, so that the base 228 can be slid to any designated position, as indicated by the pointers 245 and 246. The base member 228 can then be clamped in position by means of the clamping screws 247 and 248. The gun to be mounted on this mount can be controlled from the side of the vehicle by remote control trigger mechanism, such as that indicated at 249. In the alternative, the gun can be fired from a foot control trigger mechanism such as that shown in Fig. 30, and indicated in general by the reference numeral 250. The trigger operating mechanism 250 consists of a foot pedal 251, pivoted on the floor of the vehicle at 252, and normally spring pressed upwardly by a spring 253. An operating wire 254 having a similar function to the wire 167 previously described is provided, encased in an outer casing 255. The wire 254 is fastened to the free end of the foot pedal 251 by a screw 256, and the casing 255 is clamped to the floor board of the vehicle by a clamp indicated at 257. A safety latch 258 for the pedal 251 is pivoted on the floor of the vehicle by means of a pin 259, and is provided with a notch 260 which normally fits about and prevents downward movement of the pedal 251. A spring 261 presses the safety latch 258 into engagement with the pedal 251. The operator of the vehicle can, therefore, fire the gun by moving his foot to the left to turn the latch 258 about its pivot, and then by pressing the pedal 251 downwardly to pull the wire 254. Unless, however, this multiple foot movement is performed, the pedal 251 can not be depressed to fire the gun.

In Figs. 40 to 46, inclusive, there is disclosed a pointing arrangement for remote control where the mount of the present invention is mounted at a distance from the driver of the vehicle. The mount for the gun 11 is indicated in general at 262, and the pointing or sighting piece is indicated in general at 263. The mount 262 is provided with a supporting disk member best shown in Fig. 41 and indicated at 264. This disk member may be mounted for rotation in a horizontal plane in a manner similar to the disk member 43 of Fig. 15. The disk member 264 is rotated by a pair of wires 268 and 269 fastened to the periphery thereof and similarly fastened to a disk 272. However, the disk member 272 is provided with calibrations, indicated at 265, adapted to cooperate with a pointing insignia 266, so that the initial position of the disk 272 may be ascertained for calibration purposes. The periphery of the disk 272 is dished in, as indicated at 267 in Fig. 44, and the pair of wire members 268 and 269 are passed about the periphery of the disk 264 and fastened respectively at 270 and 271. Since, as stated, these wires are similarly fastened to the disk 264, movement of these wires by the disk 272 will, therefore, rotate the disk member 264 in a horizontal plane.

Figures 42, 43, 44, 45, 46:
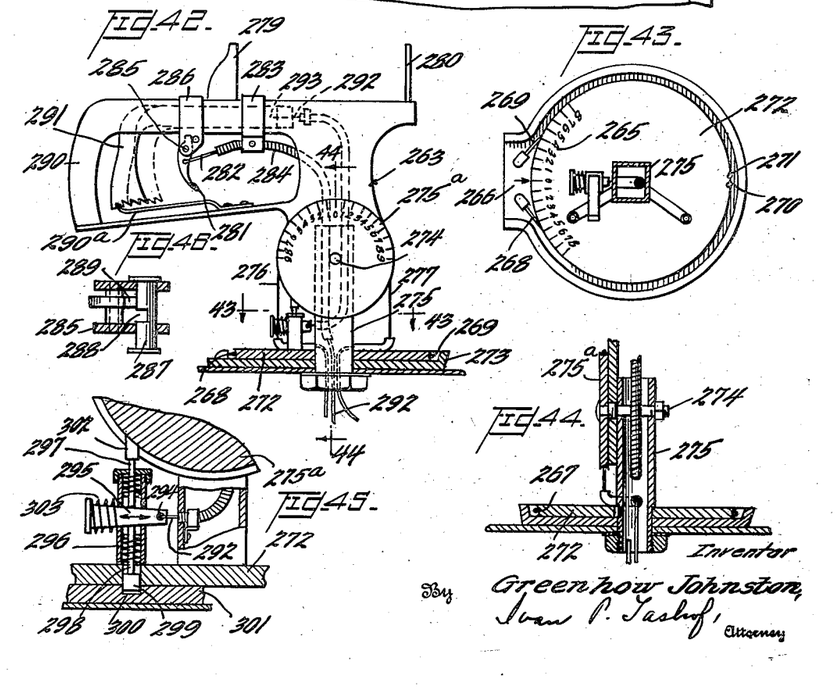
Fig. 42 is an enlarged detail of the pointing mechanism of Fig. 40.
Fig. 43 is a horizontal section taken on the line 43—43 of Fig. 42.
Fig. 44 is a vertical section taken along the line 44—44 of Fig. 42.
Fig. 45 is a detail of the braking mechanism associated with the remote control of Fig. 40.
Fig. 46 is a detail of the trigger mechanism of Fig. 42.

As shown in Fig. 42, the disk member 272 is journalled into a base member 273 for rotation, and also serves to support the pointing piece 263. Horizontal traversing movement of the pointing piece will, therefore, produce a similar horizontal traversing movement of the mount 262 and the gun 11. The pointing piece 263 is mounted for vertical traversing movement on a pivot 274, extending from a standard 275 supported by the disk 272. The pointing piece 263 is also provided with a disk member 275a, which is rotatable in a vertical plane with the pointing piece 263 about the pivot 274. Wires 276 and 277 connect the disk member 275a with a similarly disposed disk member 278 mounted for vertical traversing movements with the mount 262. This connection of the wires 276 and 277 is similar to the arrangement of the wires 268 and 269, so that vertical traversing movement of the pointing piece 263 will move through the wires 276 and 277, the mount 262 and gun 11 carried thereby. The pointing piece is provided with a rear sight 279 and a front sight 280, so that it may be pointed in any direction and aimed at an object at will. It is to be understood that the mount 262 will then be calibrated so that it will similarly point the gun 11. A trigger 281 is provided on the pointing piece 263, and connected by a wire 282 with a trigger operator on the mount 262. The function of the wire 282 is entirely similar to that of the wire 167, previously described. A bracket 283 is provided to prevent movement of the outer casing 284 for the wire 282. The trigger 281 is pivoted at 285 on a bracket 286 carried by the pointing piece 263. A safety latch 287, best shown in Fig. 46, extends through the lower end of the bracket 286, and is provided with a notch 288 which will allow movement of the upper end of the trigger when aligned therewith, and prevent movement of the upper end of the trigger 289 when in the position shown in Fig. 46.

It is to be understood that the locking member 287 is preferably square or flattened in cross section, so that it can not turn in the bracket 286, and may be frictionally held in any designated axial position, or by means of a spring. In addition to the trigger, a fixed handle member 290 is provided at the rear end of the pointing piece 263, and a movable handle member 291 is interposed between the trigger 281 and the handle 290. The movable handle member 291 is slidably mounted on the pointing piece, and is fastened to a wire 292, as indicated at 293. The wire 292 at the end remote from its fastening 293, extends into the lower end of the mount 263, and is fastened at 294 to a wedge 295, slidably mounted in a standard 296, as shown in Fig. 45. The standard 296 extends upwardly from the disk 272, previously described. Mounted in the standard for vertical reciprocating movement is a pair of rods 297 and 298. The lower end of the rod 298 is provided with a pin 299, which is adapted to extend into an opening 300 in the stationary base member 301 to prevent the rotation of the disk 272. Similarly, the rod 297 is provided with a braking portion 302 which bears against the disk 275a to prevent rotation of the disk. Movement of the wedge 295 to the right, therefore, as shown in Fig. 45, tends to apply the brake members 299 and 302 to prevent both horizontal and vertical movements of the mount 262 and the gun 11. Movement of the wedge 295 to the left, as shown in Fig. 45 will, therefore, permit the rods 297 and 298 to move the braking members 299 and 302 to a releasing position. A spring 303 is provided to move the wedge 295 to the left to unlock the brake, and since the wire 292 is attached to the right hand edge of the wedge, the wedge can be moved to the right thereby. When the handle member 291 is moved into a left hand position, as shown in Fig. 42, the wire 292 is pulled to move the wedge 295 to the right and prevent movement of the gun 11, and when the handle 291 is released, it will naturally move to the right, as shown in Fig. 2, to allow movement of the mount 262 for aiming purposes. By means of this arrangement, the gun 11 can be pointed by the pointing piece 263, and then held in the pointed position by holding the handle 291 and moving the same to the left, as shown in Fig. 42. Obviously, this arrangement may be reversed, and movement of the handle to the left used to release the gun rather than to lock the same.

While the mount of the present invention is disclosed as engaging the trigger guard of the gun, some guns do not have any trigger guard and when this is true, the holding means or hook members 88 and 89 may be proportioned so that they engage and cooperate with other parts of the carrying member.

While the mount of the present invention is primarily adapted for securely holding a gun, it may be used for holding other instruments as for example cameras, transits, sound instruments for detecting the approach of aeroplanes and any other desired equipment.

What I claim is:

1. In a mount for an instrument having a portion to be engaged, a pair of hook members for engaging said instrument portion, means to move said hook members upwardly and outwardly to allow the entry of the portion therebetween, and downwardly and convergently to clamp said portion in position, and a second means to impart an additional downward movement to said hook members.

2. In a mount for an instrument having a portion to be engaged, a pair of hook members for engaging said instrument portion, means to move said hook members upwardly and outwardly to allow the entry of the portion therebetween, and downwardly and convergently to clamp said portion in position, a second means to impart an additional downward movement to said hook members, and a single manually movable handle for operating both of said last mentioned means.

3. In a mount for a gun having a trigger guard, a casing member for supporting said gun, said casing member having a top, a pair of hook members extending through the top of said casing member for engaging the trigger guard of said gun, a slide member mounted in said casing for sliding movement, means extending from said slide member for pivotally supporting said hook members, means to guide said hook members inwardly as said slide member and hook members are moved downwardly, and outwardly as said slide and hook members are moved upwardly, and means extending from said slide for engaging said guard as the same is lowered upon said casing to assist in moving said slide downwardly and cause said hook members to move inwardly to grasp said guard.

4. In a mount for a gun having a trigger guard, a casing member for supporting said gun, said casing member having a top, a pair of hook members extending through the top of said casing member for engaging the trigger guard of said gun, a slide member mounted in said casing for sliding movement, means extending from said slide member for pivotally supporting said hook members, means to guide said hook members inwardly as said slide member and hook members are moved downwardly, and outwardly as said slide and hook members are moved upwardly, and means extending from said slide for engaging said guard as the same is lowered upon said casing to assist in moving said slide downwardly and cause said hook members to move inwardly to grasp said guard, said guide means including guide portions on each side of each of said hook members, said guide portions being positioned upon a line substantially perpendicular to the longitudinal axis of said hook members so that said portions will closely contact the sides of said hook members in both upward and downward positions.

5. In a mount for an instrument having a portion to be engaged, a casing member for supporting said instrument, a pair of hook members extending from said casing member for engaging the portion of said instrument, means to move said hook members upwardly and outwardly to allow the entry of the portion therebetween, and downwardly and convergently to clamp said portion in position, a second means to impart an additional downward movement to said hook members, a single manually movable handle for operating both of said last mentioned means, a bayonet slot in said casing through which said handle projects, said slot including an enlarged portion and a relatively narrow portion, an enlarged portion on said handle for fitting into the enlarged portion of said bayonet slot to retain said handle in downward position to similarly retain said hook members in downward position, and a narrow portion on said handle cooperating with the narrow portion of said slot when said handle is in upward position, and said hook members are in upward and outward position.

6. In a mount for a gun having a trigger guard, a casing member for supporting said gun, said casing member having a top, a pair of hook members extending through the top of said casing member for engaging the trigger guard of said gun, a slide member mounted in said casing for sliding movement, means extending from said slide member for pivotally supporting said hook members, means to guide said hook members inwardly as said slide members and hook members are moved downwardly, and outwardly as said slide and hook members are moved upwardly, means extending from said slide for engaging said guard as the same is lowered upon said casing to assist in moving said slide downwardly and cause said hook members to move inwardly to grasp said guard, means to move said sliding member upwardly and downwardly, a second means to impart an additional downward movement to said slide, and a single manually movable handle for operating both of said last mentioned means.

7. In a mount for a gun having a trigger guard, a casing member for supporting said gun, said casing member having a top, a pair of hook members extending through the top of said casing member for engagement with the trigger guard of said gun, a slide member mounted in said casing for pivotally supporting said hook members, means to guide said hook members inwardly as said slide members and hook members are moved downwardly and outwardly as said slide and hook members are moved upwardly, means extending from said slide for engaging said guard as the same is lowered upon said casing to move said slide downwardly and cause said hook members to move inwardly to grasp said guard, means to move said slide member upwardly and downwardly, a handle for moving said last mentioned means, and means to retain said handle in its lower position to similarly retain said slide and hook members in their downward and inward positions to secure said guard.

8. In a mount for a gun having a trigger guard, means for engaging the trigger guard of said gun to prevent movement thereof on said mount, means to move said first mentioned means in one direction to release said guard and in a second direction to secure said guard on said mount, and a second means to impart an additional movement to said first mentioned means and prevent relative play between said guard and mount, said last mentioned means including a cam and a guiding means therefor.

9. In a mount for a gun having a trigger guard, a pair of hook members for engaging the trigger guard of said gun, means to move said hook members upwardly and outwardly to allow the entry of the trigger guard therebetween, and downwardly and convergently to clamp said trigger guard in position, a second means to impart an additional downward movement to said hook members, said last mentioned means including a cam associated with said first mentioned means, and means to guide same cam.

10. In a mount for a gun having a trigger guard, a casing member for supporting said gun, said casing member having a top, a pair of hook members extending through the top of said casing member for engaging the trigger guard of said gun, a slide member mounted in said casing for pivotally supporting said hook members, means to guide said hook members inwardly as said slide member and hook members are moved downwardly, and outwardly as said slide member and hook members are moved upwardly, means to move said slide upwardly and downwardly including a handle and a cam on said handle extending into and cooperating with a portion of said slide member so that rotation of said handle will impart an additional downward movement to said slide.

11. In a mount for a gun having a trigger guard, a casing member for supporting said gun, said casing member having a top provided with a guide slot therein, a pair of hook members extending through the top of said casing member for engaging the trigger guard of said gun, a trigger operating member having a portion extending through the guide slot in said casing top, means to move said hook members upwardly and outwardly to allow the entry of the trigger guard therebetween and downwardly and convergently to clamp said trigger guard in position, means to move said trigger operating member when said trigger guard is positioned between said hook members and clamped thereby, and means to prevent the movement of said trigger operating member when said hook members are in their upward and outward position.

12. In a mount for a gun having a trigger guard, a casing member for supporting said gun, said casing member having a top, a pair of hook members extending through the top of said casing member for engaging the trigger guard of said gun, a guide slot formed in said casing top adjacent one of said hook members, a trigger operating member having a portion extending through said guide slot, and a trigger operating portion positioned adjacent one of said hook members when said hook member is in an upward position so that said hook member in said position prevents movement of said trigger operating member along said guide slot, means to move said hook members upwardly and outwardly to allow the entry of the trigger guard therebetween and downwardly and convergently to clamp said trigger guard in position and allow movement of said trigger operating member, and means to move said trigger operating member.

13. In a mount for a gun having a trigger guard, a casing member for supporting said gun, said casing member having a top, a pair of hook members extending through the top of said casing member for engaging the trigger guard of said gun, a guide slot formed in said casing top adjacent one of said hook members, a trigger operating member having a portion extending through said guide slot, and a trigger operating portion positioned adjacent one of said hook members when said hook member is in an upward position so that said hook member in said position prevents movement of said trigger operating member along said guide slot, means to move said hook members upwardly and outwardly to allow the entry of the trigger guard therebetween and downwardly and convergently to clamp said trigger guard in position and allow movement of said trigger operating member, a remotely positioned trigger operating handle, and a wire operating member having one end fastened to said trigger operating member and a second end fastened to said remotely positioned trigger operating handle.

14. In a mount for a gun having a trigger guard, a casing member for supporting said gun, said casing member having a top, a pair of hook members extending through the top of said casing member for engaging the trigger guard of said gun, a guide slot formed in said casing top adjacent one of said hook members, a trigger operating member having a portion extending through said guide slot, and a trigger operating portion positioned adjacent one of said hook members when said hook member is in an upward position so that said hook member in said position prevents movement of said trigger operating member along said guide slot, means to move said hook members upwardly and outwardly to allow the entry of the trigger guard therebetween and downwardly and convergently to clamp said trigger guard in position and allow movement of said trigger operating member, a remotely positioned trigger operating handle, a wire operating member having one end fastened to said trigger operating member and a second end fastened to said remotely positioned trigger operating handle, and a guiding means for said wire associated with said casing.

15. In a mount for a gun having a trigger guard, a casing member for supporting said gun, said casing member having a top adapted to receive the trigger guard of said gun, a trigger operating member projecting through the top of said casing for operating the trigger of said gun, means for preventing operation of said trigger-operating means when there is no gun in position on the mount, a trigger handle assembly remotely positioned relative to said casing and including a stationary portion and a movable handle portion, an operating wire having one of its ends connected to said trigger operating member and its other end connected to said operating handle, and a casing member about said wire having one end connected to said mount casing and the other end connected to the stationary portion of said trigger handle assembly.

16. In a mount for a gun having a trigger guard, a casing member for supporting said gun, said casing member having a top adapted to receive the trigger guard of said gun, means for clamping said gun by the trigger guard on the casing top, a trigger operating member projecting through the top of said casing for operating the trigger of said gun, a trigger handle assembly remotely positioned relative to said casing and including a stationary portion and a movable handle portion, an operating wire having one of its ends connected to said trigger operating member and its other end connected to said operating handle, a casing member about said wire having one end connected to said mount casing and the other end connected to the stationary portion of said trigger handle assembly, and means comprised by part of said clamping means for preventing movement of said trigger operating handle.

17. In a mount for a gun having a trigger guard, a casing member for supporting said gun, said casing member having a top adapted to receive the trigger guard of said gun, a trigger operating member projecting through the top of said casing for operating the trigger of said gun, a trigger handle assembly remotely positioned relative to said casing and including a stationary portion and a movable handle portion, an operating wire having one of its ends connected to said trigger operating member and its other end connected to said operating handle, a casing member about said wire having one end connected to said mount casing and the other end connected to the stationary portion of said trigger handle assembly, and means for preventing movement of said trigger operating handle including a second handle portion and means for locking said trigger operating handle actuated by said second handle portion.

18. In a mount for a gun having a trigger guard, a pair of hook members for engaging the trigger guard of said gun, means to move said hook members upwardly and outwardly to allow the entry of the trigger guard therebetween, and downwardly and convergently to clamp said trigger guard in position, a second means to impart an additional downward movement to said hook members, a casing member about said hook members having a top for supporting said trigger guard, an auxiliary supporting portion extending from said casing member, and means to detachably hook said auxiliary supporting portion to said gun, said last mentioned means being operative to prevent the removal of said gun therefrom until said gun is moved away from said hook members.

19. In a mount for a gun having a trigger guard and a gun sling holding bracket, a pair of hook members for engaging the trigger guard of said gun, means to move said hook members upwardly and outwardly to allow the entry of the trigger guard therebetween, and downwardly and convergently to clamp said trigger guard in position, a second means to impart an additional downward movement to said hook members, a casing member about said hook members for supporting said trigger guard, a supporting member extending forwardly from said casing, and means at the upper end of said additional supporting member extending about the gun sling holding bracket, said last mentioned means being adapted to prevent removal of said gun therefrom until the trigger guard of said gun is moved upwardly from said hook members.

20. In a mount for a gun having a trigger guard and a receiver having a rear end, a pair of hook members for engaging the trigger guard of said gun, means to move said hook members upwardly and outwardly to allow the entry of the trigger guard therebetween, and downwardly and convergently to clamp said trigger guard in position, a second means to impart an additional downward movement to said hook members, a casing member about said hook members for supporting said trigger guard, an auxiliary supporting member extending rearwardly from said casing member, and means at the upper end of said auxiliary supporting member for grasping the rear end of the receiver of said gun.

21. In a mount for mounting a gun having a trigger guard on a motorcycle having a handle bar and a front mud guard, a pair of hook members for engaging the trigger guard of said gun, means to move said hook members upwardly and outwardly to allow the entry of the trigger guard therebetween, and downwardly and convergently to clamp said trigger guard in position, a second means to impart an additional downward movement to said hook members, a casing about said hook members for supporting the trigger guard of said gun, and means to support said casing on the motorcycle at a relatively high elevation thereon, said last mentioned means including a supporting member extending from the handle bars of said motorcycle, and a second supporting member extending from the front mud guard thereof.

22. In a mount for a gun having a trigger guard and a receiver having a rear end on a motorcycle having a front mud guard and handle bars, a pair of hook members for engaging the trigger guard of said gun, means to move said hook members upwardly and outwardly to allow the entry of the trigger guard therebetween, and downwardly and convergently to clamp said trigger guard in position, a second means to impart an additional downward movement to said hook members, a casing about said hook members for supporting said trigger guard, an auxiliary supporting member extending rearwardly from said casing, means at the upper end of said auxiliary supporting member for grasping the rear end of the receiver of said gun, and means to support said casing from the motorcycle, said last mentioned means including supporting members fastened to the mud guard of said motorcycle, and a second set of supporting members fastened to the handle bars thereof.

23. In a mount for a gun having a trigger guard and a receiver having a lower end provided with grooves, a pair of hook members for engaging the trigger guard of said gun, means to move said hook members upwardly and outwardly to allow the entry of the trigger guard therebetween, and downwardly and convergently to clamp said trigger guard in position, a casing about said hook members, a second means to impart an additional downward movement to said hook members, an auxiliary supporting member extending rearwardly from said casing, a guide member pivoted at the upper end of said auxiliary support and provided with inwardly turned portions for fitting into the grooves at the lower end of the receiver of said gun, and a spring pressed pawl extending through said guide member into engagement with the receiver of said gun.

24. In a mount for a gun having a trigger guard on a motorcycle having handle bars, a front mud guard and a front axle generally supporting the handle bars and front mud guard, a casing member adapted to support the trigger guard of said gun, means within said casing member to clamp said trigger guard on said casing, and means including supporting members fastened to the handle bars and additional supporting members attached to the front mud guard to support said casing on a motorcycle so that substantially all of the weight of said mount and gun is carried by the front axle of said motorcycle.

25. In a mount for a gun having a trigger guard and a magazine receiving portion provided with a magazine, a pair of hook members for engaging the trigger guard of said gun, a forwardly extending portion of said mount provided with an opening to receive the magazine of said gun, and means extending forwardly from said hook members and adapted to engage the magazine receiving portion of said gun to clamp the same on said mount.

26. In a mount for a gun having a trigger guard and a magazine receiving portion provided with a magazine, a gun receiving head provided with an opening for receiving the magazine of said gun and a rear portion adapted to support the trigger guard of said gun, means projecting upwardly from said rear to engage said trigger guard, a second means pivoted on said head and adapted to engage the magazine receiving portion of said gun, and means to simultaneously move both of said first mentioned means.

GREENHOW JOHNSTON.